United States Patent [19]
Gray

[11] Patent Number: 6,142,013
[45] Date of Patent: Nov. 7, 2000

[54] NAVIGATIONAL AID FOR AGRICULTURAL EQUIPMENT

[75] Inventor: Leonard Gray, Box 57, Laurier, Manitoba, Canada, R0J 1A0

[73] Assignees: Leonard Gray, Laurier; Kenneth Ross Parson, Elrose

[21] Appl. No.: 09/177,601

[22] Filed: Oct. 23, 1998

[30] Foreign Application Priority Data

Oct. 17, 1996 [CA] Canada .................................. 2188106

[51] Int. Cl.⁷ .................................................. G01C 21/00
[52] U.S. Cl. .......................................................... 73/178 R
[58] Field of Search ........................ 73/178 R; 33/185 V, 33/264, 392, 161, 293

[56] References Cited

U.S. PATENT DOCUMENTS

| | | |
|---|---|---|
| 2,548,226 | 4/1951 | Maier . |
| 2,559,761 | 7/1951 | Fulton . |
| 3,199,487 | 8/1965 | Heinkel ..................................... 33/264 |
| 4,016,653 | 4/1977 | Bartlett . |
| 4,393,596 | 7/1983 | Gerber ..................................... 33/264 |
| 5,094,001 | 3/1992 | Fraser . |
| 5,146,686 | 9/1992 | Brown ..................................... 33/264 |

*Primary Examiner*—William Oen
*Attorney, Agent, or Firm*—Murray E. Thrift; Adrian D. Battison; Michael R. Williams

[57] ABSTRACT

A navigational aid assists a person driving a vehicle in maintaining a desired distance from a reference line. It is particularly useful in navigating agricultural vehicles. The navigational aid includes an upright rail mounted adjacent a window in the cab of the vehicle. A marker is carried by the rail and may be positioned on the line of sight from the driver to the reference line. Driving the vehicle with the marker maintained on the line of sight keeps the vehicle at a constant distance from the reference line. The marker may be an element slidably mounted on the rail.

16 Claims, 5 Drawing Sheets

NAVIGATIONAL AID FOR AGRICULTURAL EQUIPMENT

FIELD OF THE INVENTION

The present invention provides a navigational aid for a person driving a vehicle to aid in maintaining a desired distance from a line of reference, and particularly a navigational aid for use in navigating agricultural vehicles.

BACKGROUND

When working fields with self-propelled or towed agricultural equipment such as tractors, swathers and sprayers it is important not to overlap and rework areas of the field, or to leave gaps between worked areas leaving portions of the field idle. Both overlapping and leaving gaps can lead to a decrease in field efficiency which can be wasteful and expensive.

In an attempt to prevent this problem from occurring various navigational aids have been developed in the past to try to help the driver of the vehicle to align the vehicle a distance from the last pass by the vehicle so that the self propelled or towed equipment will not overlap or miss areas. These navigational aids have included such things as foam and disk markers for marking the field, tram lines, and global positioning systems.

As well as these methods various means for sighting along a marked line or along an edge of the worked portion of the ground have been developed. These sighting methods are often mounted externally of the vehicle making adjustment difficult, or involve complex mechanisms for calibrating and adjusting lines of sight. Many of these sighting devices are fixed making them difficult to adjust to suit different drivers or to suit the use of different types of equipment. Furthermore these sighting devices are often difficult to realign after turning and can be difficult to install often requiring modifications to the vehicle or special hardware.

SUMMARY

According to the present invention there is provided a navigational aid for aiding a person at a driver's station of a vehicle to drive the vehicle at a desired lateral distance from a line of reference, said navigational aid comprising:

an elongate rail;

rail mounting means for mounting the rail on the vehicle in front of and to one side of the driver's station;

a visual marker carried by the rail; and marker positioning means for locating the visual marker at a position on the rail on a line of sight between an eye of the person at the driver's station and the line of reference, thereby enabling the person to maintain the desired distance from the line of reference by driving the vehicle such that the pointer remains on said line of sight.

Preferably indicia are spaced along the rail to indicate the position of the marker along the rail. The marker may be any visible element on the upright. It may be a pointer slideable on the rail or it may be one of a series of lights spaced along the member.

The rail mounting means may be a pressure sensitive adhesive, for example an adhesive strip on a back side of the member for mounting the aid on an inner surface of a vehicle window. Other appropriate means for mounting the aid in place on the vehicle, for example adhesives, various fasteners including bolts, screws and rivets, and hook and loop fasteners may be used. The adhesive strip is currently preferred as it is useful on most surfaces, including window glass.

This aspect of the invention also provides an agricultural vehicle on which the navigation aid has been mounted.

Two of more navigational aids may be located within the cab of the vehicle at positions which are spaced laterally apart from one another, normally along opposite sides of the windshield or on respective side windows. This allows the person driving the vehicle to use the navigational aid on one side of the vehicle on one pass across a field then use the navigational aid on the other side of the vehicle on the return pass.

In agricultural applications, the reference line will normally be a line made by a field marker, the edge of an area of worked soil or the like.

According to a second aspect of the present invention there is provided a method of navigating a vehicle having a front window and a driver's station, said method comprising:

providing an elongate rail;

mounting the rail adjacent the front window of the vehicle, in front of and to one side of the driver's station;

providing a visual marker on the rail;

positioning the vehicle a desired lateral distance from a line of reference;

positioning the marker at a position on the rail on a line of sight between an eye of a person at the driver's station and the line of reference; and driving the vehicle such that the marker remains on said line of sight thereby maintaining the vehicle said desired distance from the line of reference.

BRIEF DESCRIPTION OF THE DRAWINGS

In the accompanying drawings, which illustrate an exemplary embodiment of the present invention.

DETAILED DESCRIPTION

Figure 1:
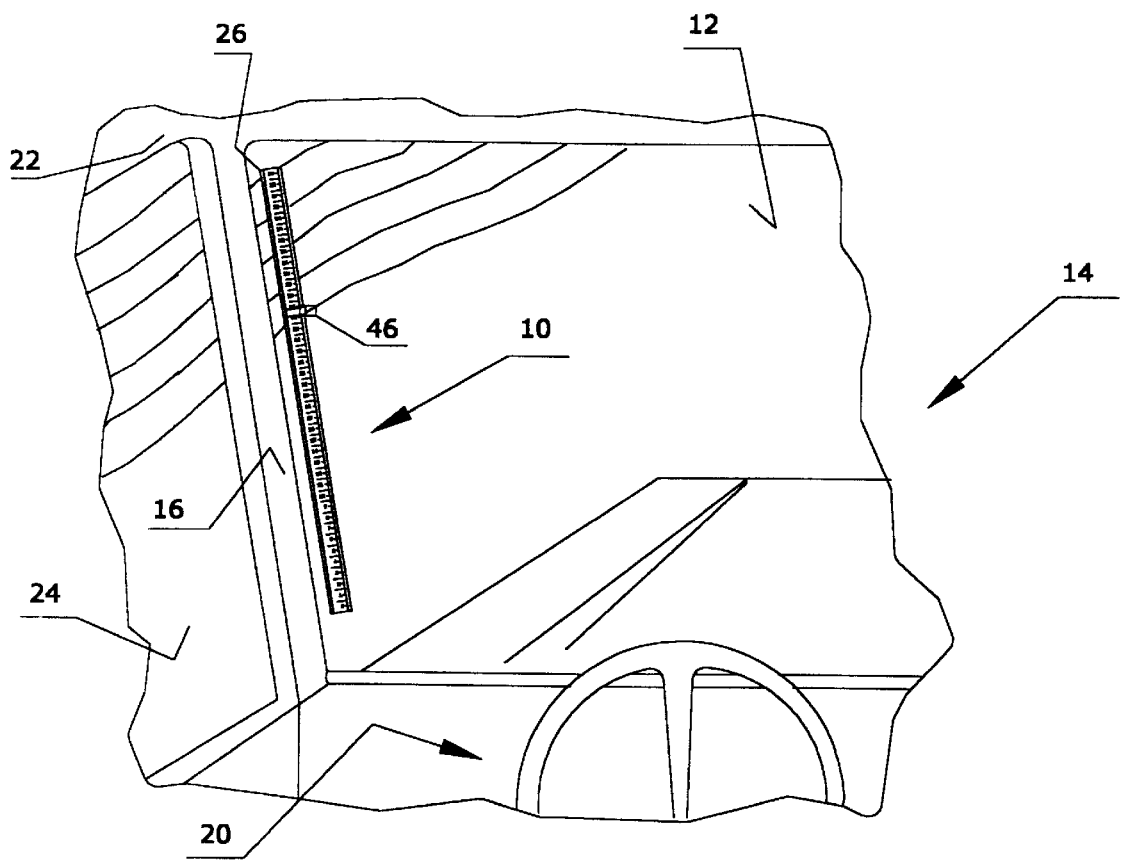
FIG. 1 shows the navigational aid in place on the interior of a vehicle.

Referring to the drawings, there is illustrated a navigational aid 10. In FIG. 1, the navigational aid is shown mounted on the windshield 12 of an agricultural vehicle 14, adjacent an upright post 16 at one side of the windshield. The navigational aid 10 is used for aiding a person driving the vehicle 14 in maintaining a desired lateral distance from a line of reference 18 on the field which is being worked.

The vehicle 14 includes a drivers station 20 which is located in an enclosed cab 22 with the windshield 12 and side windows 24.

Figure 3:
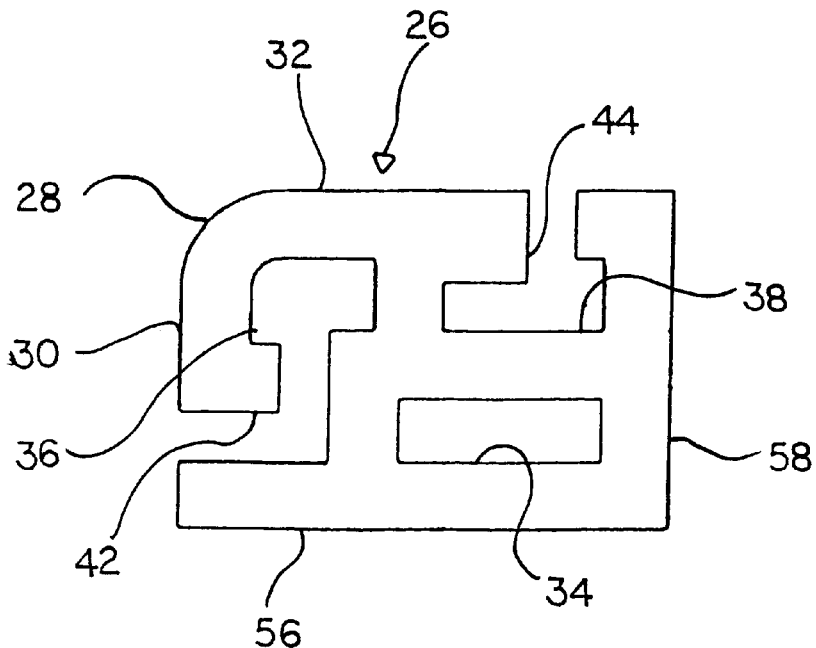
FIG. 3 is a top view of the rail.

The navigational aid 10 includes an elongate rail 26 of UV-resistant lightweight plastics material. As shown in FIG. 3, the rail 26 is an elongate member of generally rectangular cross-section, with a rounded corner 28 between adjacent first and second sides 30 and 32. The rail 26 is formed as an extruded profile with three cores 34, 36 and 38. A slot 40 along the first side 30 extends into core 36 to form an L-shaped channel or track 42. A second slot or track 44 along the second side 32 is L-shaped and extends into core 38. This open core configuration reduces the wall thickness for molding purposes.

Figure 4:
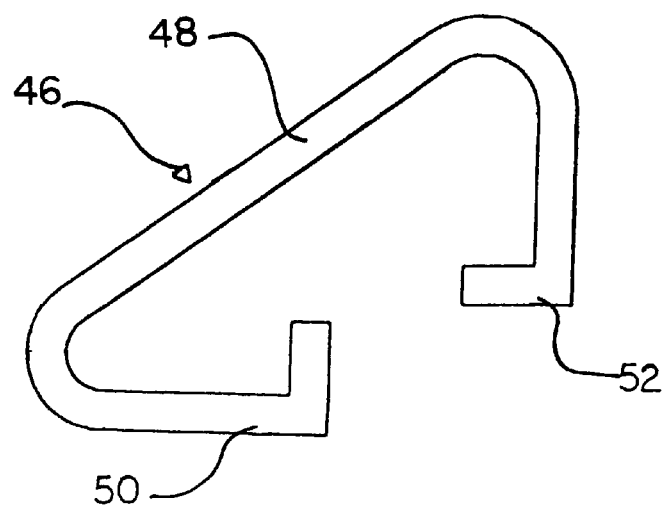
FIG. 4 is a top view of a pointer marker.
Figure 5:
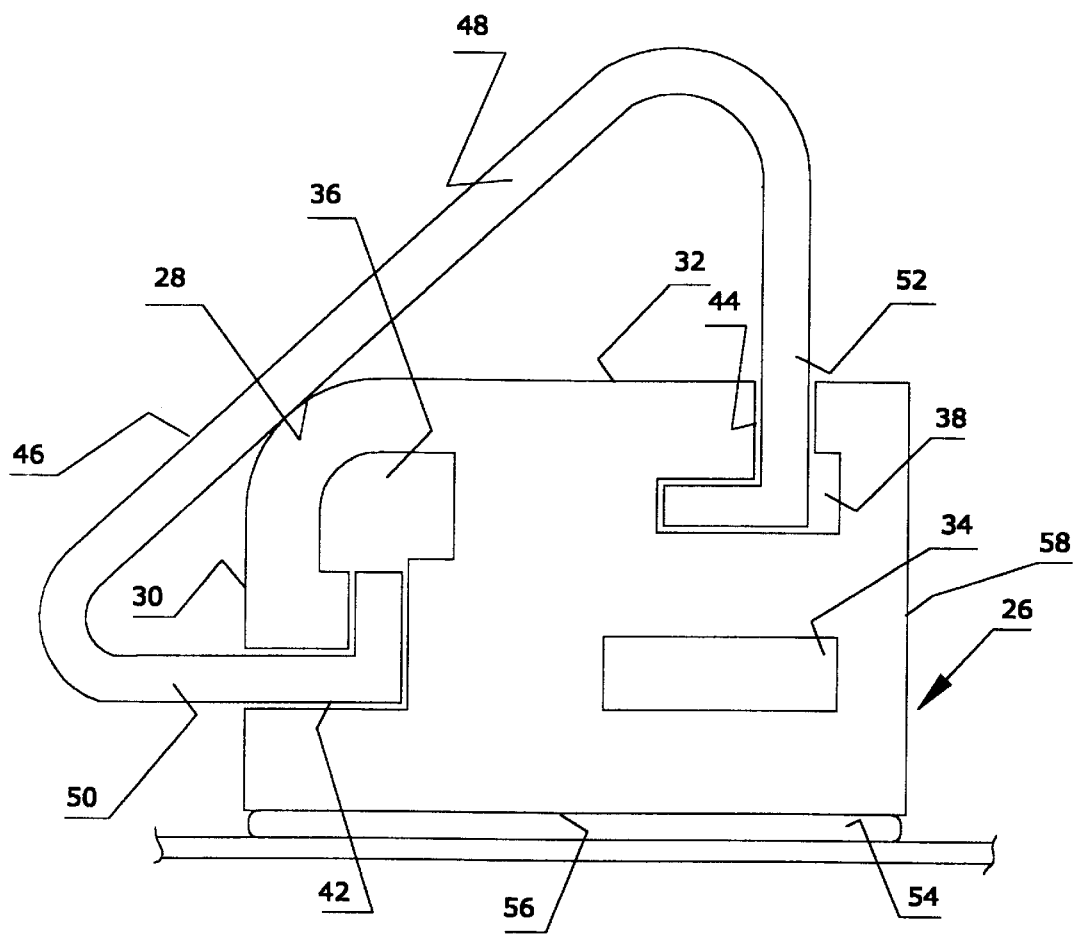
FIG. 5 is a top view of the pointer in place on the rail.
Figure 6:
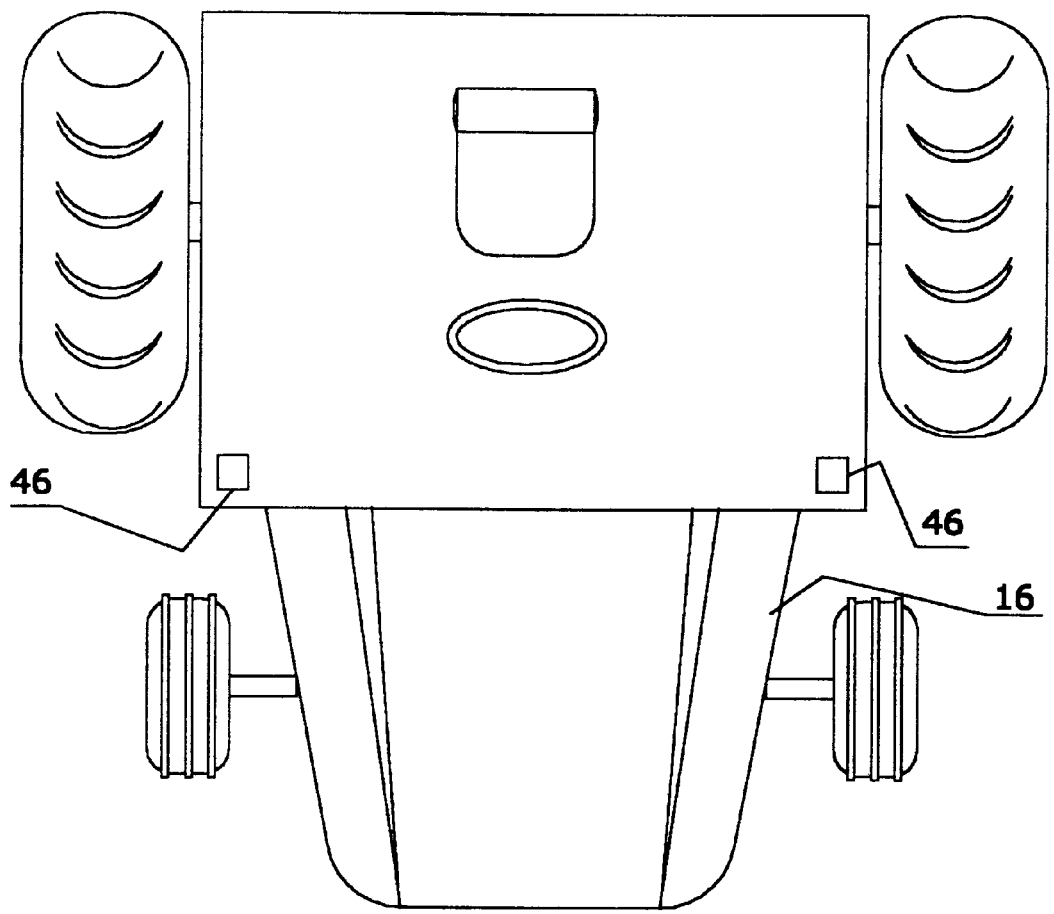
FIG. 6 is a top view of a tractor, partially broken away, with two of the navigational aids.

As most particularly illustrated in FIGS. 3, 4, and 5, a marker 46 includes a web 48 and two L-shaped flanges 50 and 52 at the edges of the web. The corners between the web and flanges are rounded. Flange 50 engages slidably in the L-shaped track 42 of the rail 26, and flange 52 engages slidably in the track 44. The web 48 extends across the rounded corner 28 of the rail 26 and beyond both of its sides 30 and 32.

Figure 2:
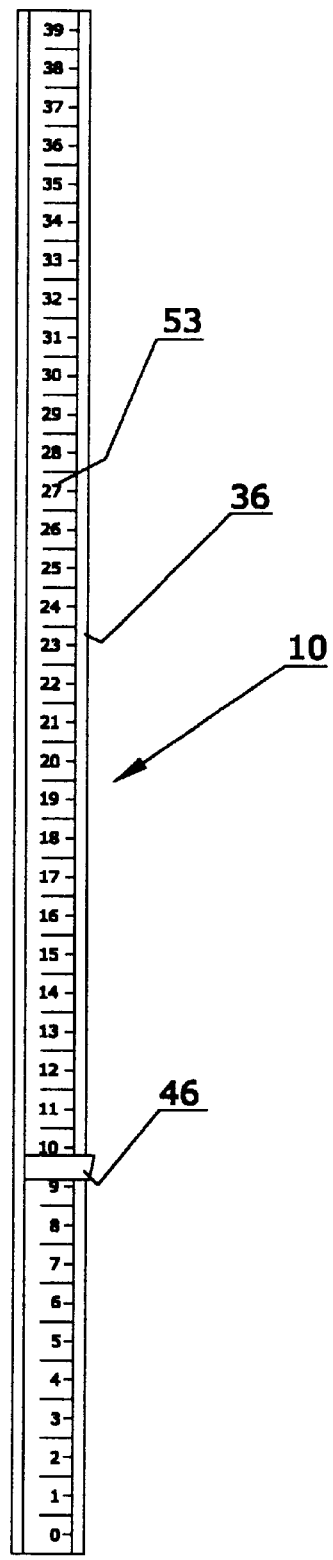
FIG. 2 is a front view of the navigational aid.

As illustrated most particularly in FIG. 2, the rail 26 has indicia 53 spaced along its first side 36. The indicia are numbers and lines forming a scale for indicating the position of the marker 46 along the rail. The indicia 53 allow vehicle drivers to note the proper marker position for a specific piece of equipment being used. This enables each individual to adjust the navigational aid 10 easily for use by the particular driver and piece of equipment.

The rail 26 is fixed to the vehicle 14 in front of and to one side of the driver's station. It is usually mounted on the inside surface of the windshield 12 or on a side window 24. Depending on the vehicle layout, and user preferences, it may also be fixed to some other structure within the vehicle. The rail 26 is mounted using a strip of double faced adhesive tape 54 on one of the two flat sides 56 and 58 of the rail 26 opposite the first and second sides 30 and 32.

With the vehicle 16 at the desired distance from the reference line 18, the marker 46 is positioned on the rail 26 on the line of sight between the driver of the vehicle and the reference line 18, such that the projecting end of the marker 46 appears to lie on the reference line 18. This enables the person driving the vehicle to maintain a desired distance from the reference line 18 by driving the vehicle 16 so as to keep the marker 46 on the line of sight to the reference line.

Two of more navigational aids may be located within the cab of the vehicle at positions which are spaced laterally apart from one another such as on opposing side windows or at opposite sides of the windshield. This allows the person driving the vehicle to use the navigational aid on one side of the vehicle, then turn the vehicle 180 degrees and use the navigational aid on the other side of the vehicle.

While one embodiment of the present invention has been described in the foregoing, it is to be understood that other embodiments are possible within the scope of the invention. Thus, in alternative embodiments any appropriate material may be used as a substitute for the UV-resistant plastics material, and any appropriate means of fixing the rail to the window or vehicle may be used. It is also possible to replace the sliding marker with other forms of marker, for example a set of lights distributed along the rail and a control for selecting each light for individual activation. The invention is therefore to be considered limited solely by the scope of the appended claims.

What is claimed is:

1. A navigational aid for aiding a person at a driver's station of a vehicle to drive the vehicle at a desired lateral distance from a line of reference, said navigational aid comprising:
   an elongate rail;
   rail mounting means for mounting the rail on the vehicle in front of and to one side of the driver's station;
   a visual marker carried by the rail; and
   marker positioning means for locating the visual marker at a position on the rail on a line of sight between an eye of the person at the driver's station and the line of reference, thereby enabling the person to maintain the desired distance from the line of reference by driving the vehicle such that the pointer remains on said line of sight.

2. A navigational aid according to claim 1 wherein the rail includes indicia spaced therealong for indicating the position of the marker on the rail.

3. A navigational aid according to claim 1 wherein the marker is mounted slidably on the rail.

4. A navigational aid according to claim 3 including a track extending along the rail and wherein the marker includes means engaging slidably in the track.

5. A navigational aid according to claim 3 wherein the marker projects beyond at least one side of the rail.

6. A navigational aid according to claim 3 including two tracks extending along the rail and wherein the marker comprises two flanges engaged slidably in the respective tracks.

7. A navigational aid according to claim 1 wherein the rail mounting means comprise a pressure sensitive adhesive.

8. A method of navigating a vehicle having a front window and a drivers station, said method comprising:
   providing an elongate rail;
   mounting the rail adjacent the front window of the vehicle, in front of and to one side of the driver's station;
   providing a visual marker on the rail;
   positioning the vehicle a desired lateral distance from a line of reference;
   positioning the marker at a position on the rail on a line of sight between an eye of a person at the driver's station and the line of reference; and
   driving the vehicle such that the marker remains on said line of sight thereby maintaining the vehicle said desired distance from the line of reference.

9. An agricultural vehicle having a driver's station and a navigational aid for aiding a person driving the vehicle in maintaining a desired lateral distance from a line of reference wherein said navigational aid comprises:
   an elongate rail;
   rail mounting means mounting the rail on the vehicle in front of and to one side of the driver's station;
   a visual marker carried by the rail; and
   marker positioning means for locating the visual marker at a position on the rail on a line of sight between an eye of the person at the driver's station and the line of reference, thereby enabling the person to maintain the desired distance from the line of reference by driving the vehicle such that the pointer remains on said line of sight.

10. An agricultural vehicle according to claim 9 wherein the rail includes indicia spaced therealong for indicating the position of the marker on the rail.

11. An agricultural vehicle according to claim 9 wherein the marker is mounted slidably on the rail.

12. An agricultural vehicle according to claim 11 including a track extending along the rail and wherein the marker includes means engaging slidably in the track.

13. An agricultural vehicle according to claim 11 wherein the marker projects beyond at least one side of the rail.

14. An agricultural vehicle according to claim 11 including two tracks extending along the rail and wherein the marker comprises two flanges engaged slidably in the respective tracks.

15. An agricultural vehicle according to claim 9 wherein the rail mounting means comprise a pressure sensitive adhesive.

16. An agricultural vehicle according to claim 9 including two of said navigation aids mounted in front of and on opposite sides of the driver's station.

* * * * *